United States Patent
Joshi et al.

(10) Patent No.: US 10,523,665 B2
(45) Date of Patent: Dec. 31, 2019

(54) AUTHENTICATION ON THIN CLIENTS USING INDEPENDENT DEVICES

(71) Applicant: Wyse Technology L.L.C., Santa Clara, CA (US)

(72) Inventors: Salil Joshi, Fremont, CA (US); Puneet Kaushik, Fremont, CA (US); Sumit Popli, Campbell, CA (US); Suruchi Dubey, Fremont, CA (US); Oleg Rombakh, Los Gatos, CA (US); Varun Raghavan, Santa Cruz, CA (US)

(73) Assignee: Wyse Technology L.L.C., Santa Clara, CA (US)

( * ) Notice: Subject to any disclaimer, the term of this patent is extended or adjusted under 35 U.S.C. 154(b) by 181 days.

(21) Appl. No.: 15/423,715

(22) Filed: Feb. 3, 2017

(65) Prior Publication Data
US 2018/0227296 A1 Aug. 9, 2018

(51) Int. Cl.
*H04L 29/06* (2006.01)
*H04W 12/06* (2009.01)

(52) U.S. Cl.
CPC ......... *H04L 63/0853* (2013.01); *H04W 12/06* (2013.01); *H04L 63/0861* (2013.01)

(58) Field of Classification Search
CPC . H04L 63/0853; H04L 63/0861; H04W 12/06
See application file for complete search history.

(56) References Cited

U.S. PATENT DOCUMENTS

| | | | | |
|---|---|---|---|---|
| 2007/0136804 A1* | 6/2007 | Ohsawa | ............. | H04L 63/0853 726/14 |
| 2009/0106571 A1* | 4/2009 | Low | ..................... | G06F 9/4856 713/310 |
| 2012/0331532 A1* | 12/2012 | Walters | ................... | H04L 12/66 726/5 |
| 2014/0189808 A1* | 7/2014 | Mahaffey | ............. | H04L 63/083 726/4 |
| 2014/0304780 A1* | 10/2014 | Kuang | .................... | H04L 63/06 726/4 |
| 2016/0337346 A1* | 11/2016 | Momchilov | ............ | G06F 21/34 |
| 2017/0331834 A1* | 11/2017 | Malik | ................... | H04W 12/06 |
| 2017/0339135 A1* | 11/2017 | Hinohara | .............. | H04L 63/083 |

* cited by examiner

*Primary Examiner* — Alexander Lagor
*Assistant Examiner* — Rodman Alexander Mahmoudi
(74) *Attorney, Agent, or Firm* — Kirton McConkie; Brian Tucker (57) ABSTRACT

Authentication can be performed on thin clients using independent mobile devices. Because many users have smart phones or other similar mobile devices that include biometric scanners, such mobile devices can be leveraged to perform authentication of users as part of logging in to a thin client desktop. A mapping can be created on a central server between a user's mobile device and the user's domain identity. A mapping can also be created between the user's domain identity and the user's thin client desktop. Then, when a user desires to log in to his thin client desktop, the user can employ the appropriate biometric scanner on his mobile device to perform authentication. The central server can then rely on this authentication to identify and log the user into his thin client desktop.

20 Claims, 11 Drawing Sheets

Receive, At An Authentication Service That Executes On A Server, An Authentication Notification That Indicates That A User Has Performed Authentication On A Mobile Device, The Authentication Notification Including Mobile Device Information That Identifies The Mobile Device

702

Use The Mobile Device Information Included In The Authentication Notification To Identify A Domain Identity Of The User And A Thin Client Desktop Associated With The Domain Identity

703

Send A Logon Command To An Agent On A Thin Client Including Providing Login Information For The Domain Identity To Allow The Agent To Log The User Into The Thin Client Desktop Associated With The Domain Identity

*FIG. 7*

AUTHENTICATION ON THIN CLIENTS USING INDEPENDENT DEVICES

CROSS-REFERENCE TO RELATED APPLICATIONS

N/A

BACKGROUND

The present invention is generally directed to performing authentication on a thin client using an independent mobile device. Authentication on a thin client is typically performed using a username and password as is common with most personal computers. Several problems exist with this typical authentication approach. First, when passwords and their corresponding questions are stored online, they are susceptible to hacking. Second, many users write their passwords down near the computers to which the passwords apply making a breach easily obtainable to anyone with physical access to the location of the computers. Third, many people use passwords that can be easily guessed based on information about the user that is available on social networking websites.

In addition to these security issues, it may also be difficult for the user to manage his or her passwords. This is especially true when administrators apply strict security requirements when selecting passwords. For example, if a user is required to include numbers or special characters in the password or change the password frequently, he or she will be more likely write down the password or use a meaningful word or phrase within the password so that it is easier to remember. In short, regardless of the efforts that are made to enhance its security, password-based authentication will remain susceptible to hacking.

To address these concerns, many computers now include biometric scanners that allow biometric-based authentication to be performed. For example, many laptops, tablets, and smart phones include fingerprint sensors that allow a user to login with a fingerprint. Unfortunately, most thin clients do not include fingerprint sensors or other biometric scanners due primarily to the fact that their inclusion would render the thin clients too expensive (or no longer "thin") thereby defeating their purpose. Therefore, to allow biometric-based authentication in a thin client environment, it would typically be necessary to invest in biometric scanners that could be connected to the thin clients. The same is true for smart card-based authentication or other hardware token-based authentication techniques. Therefore, for cost and management reasons, these approaches will oftentimes not be suitable.

Currently, some solutions exist that allow a user to unlock a computer using another device. For example, the FingerKey app allows Mac users to unlock a Mac using the Touch ID fingerprint sensor of an iPhone. For FingerKey to work, a companion application, FingerLock must be installed on the Mac. During the login process, the FingerKey app will prompt the user to scan his fingerprint on his iPhone and then communicate a successful scan to the FingerLock application which in turn will input the password into the password text box on the Mac. In essence, FingerKey provides a way for the user to input his password into the Mac without actually having to type it on the keyboard. Because FingerKey only automates the password login process, it will not function in a corporate environment (e.g., in an Active Directory environment).

BRIEF SUMMARY

The present invention extends to methods, systems, and computer program products for performing authentication on thin clients using independent mobile devices. Because many users have smart phones or other similar mobile devices that include biometric scanners, such mobile devices can be leveraged to perform authentication of users as part of logging in to a thin client desktop. A mapping can be created on a central server between a user's mobile device and the user's domain identity. A mapping can also be created between the user's domain identity and the user's thin client desktop. Then, when a user desires to log in to his thin client desktop, the user can employ the appropriate biometric scanner on his mobile device to perform authentication. The central server can then rely on this authentication to identify and log the user into his thin client desktop.

In one embodiment, the present invention is implemented as a method for performing authentication on a thin client using a mobile device. An authentication service that executes on a server can receive an authentication notification that indicates that a user has performed authentication on a mobile device. The authentication notification includes mobile device information that identifies the mobile device. The authentication service can use the mobile device information included in the authentication notification to identify a domain identity of the user and a thin client desktop associated with the domain identity. The authentication service can then send a logon command to an agent on a thin client including providing login information for the domain identity to allow the agent to log the user into the thin client desktop associated with the domain identity.

In another embodiment, the present invention is implemented as a method for performing authentication on a thin client using a mobile device. In response to a user authenticating on a mobile device, a mobile application on the mobile device can send an authentication notification that includes mobile device information that identifies the mobile device. In response to receiving the authentication notification, an authentication service on a server can identify a domain identity associated with the mobile device information included in the authentication notification. Based on the domain identity, the authentication service can identify a thin client desktop and send a logon command to an agent on a thin client. The authentication service can provide login information associated with the thin client desktop to the agent. The agent can then employ the login information to log a user into the thin client desktop on the thin client.

In another embodiment, the present invention is implemented as a method for logging a user into a thin client desktop. An authentication service receives an authentication notification that indicates that a user of a mobile device has successfully authenticated on the mobile device. Based on the authentication notification, the authentication service can identify a domain identity of the user as well as a thin client desktop associated with the domain identity. The authentication service can then instruct an agent on a thin client to employ the domain identity to log the user into the thin client desktop on the thin client.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "thin client" should be construed as any computing device that is capable of providing a desktop whether or not the desktop is locally or remotely executed. The term "mobile device" should be construed as any computing device that includes (or is coupled to) one or more biometric scanners or other types of authentication architectures (e.g., a smartcard architecture or token-based architecture) and that can communicate over a network with a server. Therefore, although a mobile device may typically be a smart phone with a fingerprint sensor, the present invention may equally be implemented when the mobile device is a media player, tablet, laptop, or even desktop device that includes or is connected to any type of authentication architecture. The term "independent" in the context of mobile devices will refer to the fact that the users provide the mobile devices rather than an employer or other entity that provides the thin clients. In preferred embodiments, independent mobile devices will be used for performing authentication on a thin client. However, whether or the mobile devices are independent is not essential to the invention.

Figure 1:
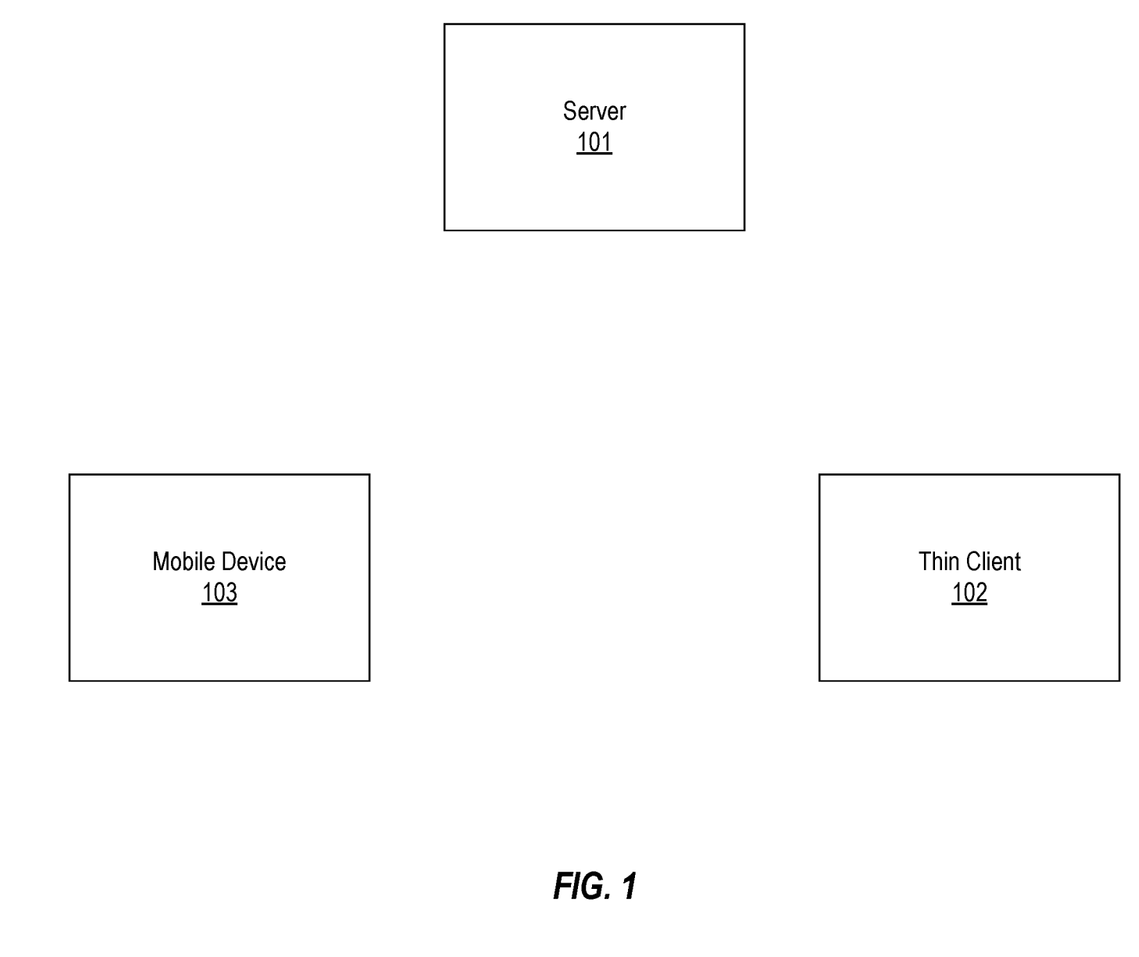
FIG. 1 illustrates an example computing environment in which the present invention can be implemented.

FIG. 1 illustrates an example environment in which the present invention can be implemented. The environment can include a server 101, a thin client 102 (which would typically represent a large number of thin clients), and a mobile device 103 (which again would typically represent a large number of mobile devices). As an example, a company may provide thin clients that its employees use to access their desktops. In such a scenario, server 101 would typically be coupled to each of the thin clients 102 via a LAN and would provide directory services for the network. For example, server 101 can function as a domain controller (or can at least communicate with a domain controller) in an Active Directory domain or as an equivalent component in another directory services architecture. Importantly, server 101 can maintain information necessary for logging a user into a desktop on thin client 102.

Figure 2:
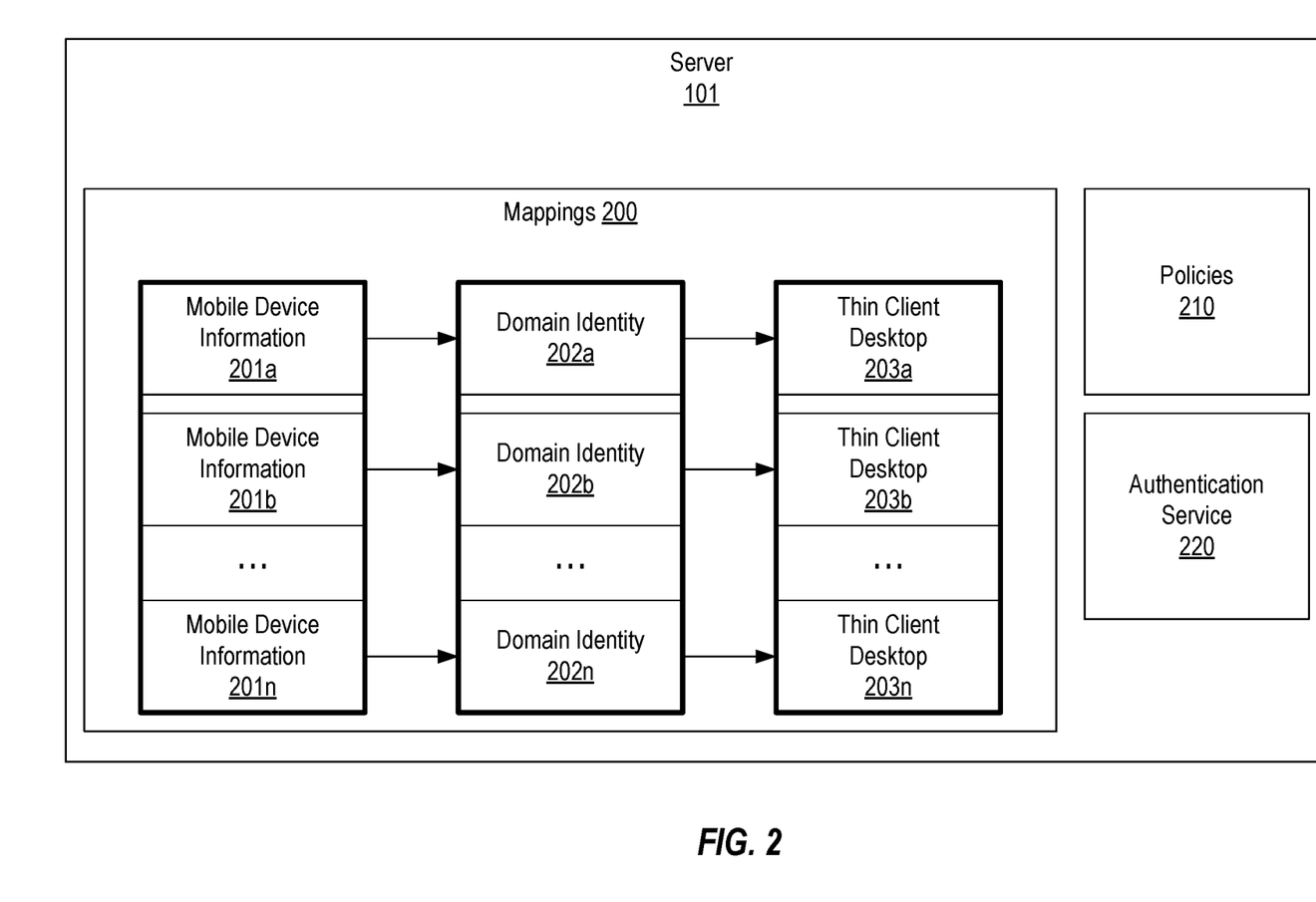
FIG. 2 illustrates example components of a server that can be employed to implement the present invention.

FIG. 2 provides an example of various components that may be included on server 101 to enable implementation of the present invention. As shown, server 101 includes mappings 200 which link mobile device information for a particular mobile device to a domain identity. Mobile device information can include one or more types of information that can uniquely identify a mobile device. For example, this mobile device information can include an IMEI number, a phone number, a MAC address, etc. A domain identity can include the user's username on the domain as well as his password or other credentials for logging in on the domain.

Mappings 200 may also define a link between each domain identity and a thin client desktop. In the case that the thin client 102 provides a Windows desktop, the "thin client desktop" can be viewed as the user profile which defines the settings and desktop configurations for that user. In non-Windows environments, the "thin client desktop" can comprise the user-specific settings that define the user's experience when logged in. In short, the term "thin client desktop" should be construed as user-specific information for configuring a desktop experience when a user is logged into a thin client. Mappings 200 can include sufficient information to allow authentication service 220 to identify a thin client desktop for a particular domain identity. It is important to note that the thin client desktops themselves do not necessarily need to be stored in mappings 200. Therefore, thin client desktops 203a-203n can represent information that identifies the desktops. In other embodiments, however, authentication service 220 can be tasked with providing the actual desktops to thin clients. In such embodiments, thin client desktops 203a-203n can represent the actual desktops.

In the depicted example, mobile device information 201a is linked to domain identity 202a which is linked to thin client desktop 203a. Similarly, mobile device information 201b is linked to domain identity 202b which is linked to thin client desktop 203b. Further, mobile device information 201n (where n is intended to represent any number) is linked to domain identity 202n which is linked to thin client desktop 203n. In some embodiments, a user may be allowed to register multiple mobile devices for authentication purposes (to thereby allow the user to authenticate with any of the registered devices). In such cases, multiple sets of mobile device information may map to the same domain identity. Also, in some embodiments, a user may be provided access to multiple desktops. In such cases, there can be a one-to-multiple mapping between mobile device information and domain identities. In other words, the user's mobile device may map to multiple possible desktops. In such cases, the process described below can be modified to allow the user to select which desktop to log into.

Server 210 is also shown as including policies 210 which may be Active Directory Group Policy Objects or any other suitable policy data structure. Policies 210 can define various rules governing the use of a mobile device for authentication purposes. For example, certain users may be required to use certain types of devices or certain types of authentication as will be described further below. Finally, server 101 includes authentication service 220 which can be configured to perform the functionality described below to allow authentication to be performed on a mobile device to log into a thin client desktop.

Mappings 200 can be created as part of a device registration process. For example, if a user desires to employ the authentication techniques of the present invention, he can visit an administrator (or use some type of portal) to provide information about a mobile device that he would like to employ in the process. The administrator can then create a mapping between the user's mobile device information and the user's domain identity in mappings 200. If not already created, a mapping between the user's domain identity and the corresponding thin client desktop can also be created.

Figure 3:
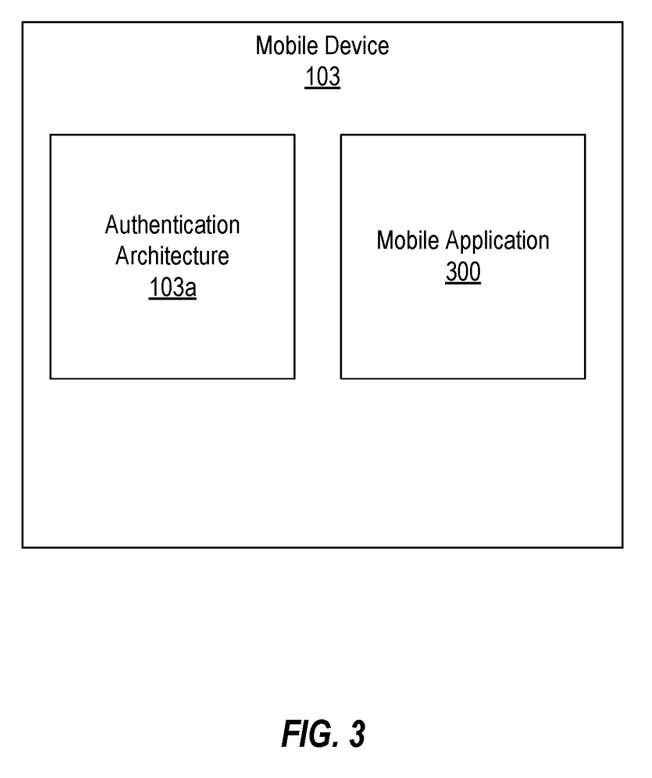
FIG. 3 illustrates example components of a user's mobile device that can be employed to implement the present invention.
Figure 4:
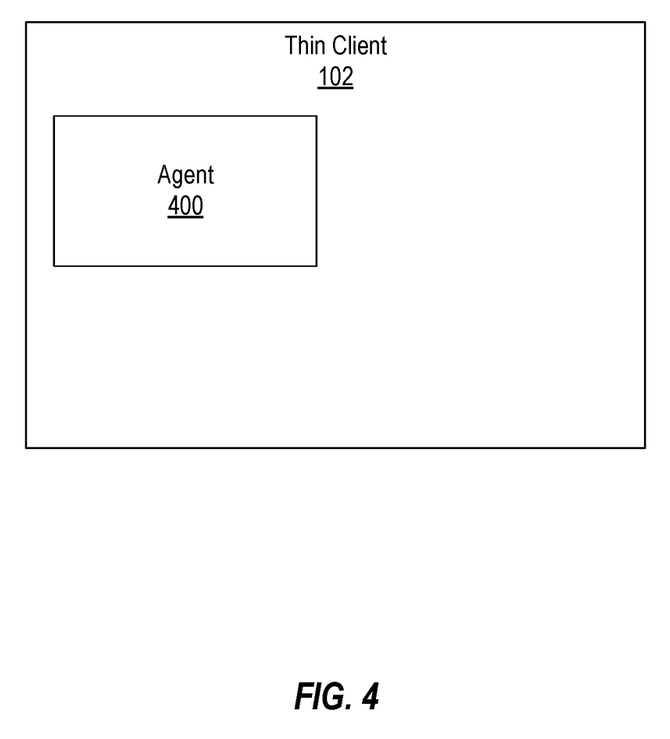
FIG. 4 illustrates example components of a thin client that can be employed to implement the present invention.

FIG. 3 provides an example of components that may be included on mobile device 103 to enable implementation of the present invention. Mobile device 103 can include some type of authentication architecture 103a. For example, authentication architecture 103a can include a fingerprint scanner, an iris or retina scanner, a voice recognition system, a facial recognition system, a smartcard system, a hardware token system, etc. Mobile device 103 can also include a mobile application 300 that is configured to interface with authentication architecture 103a and authentication service 220 to implement the techniques of the present invention. FIG. 4 illustrates that each thin client 102 can include an agent 400 that is configured to interface with authentication service 220 for the purpose of logging a user into a desktop on thin client 102.

Figure 5A:
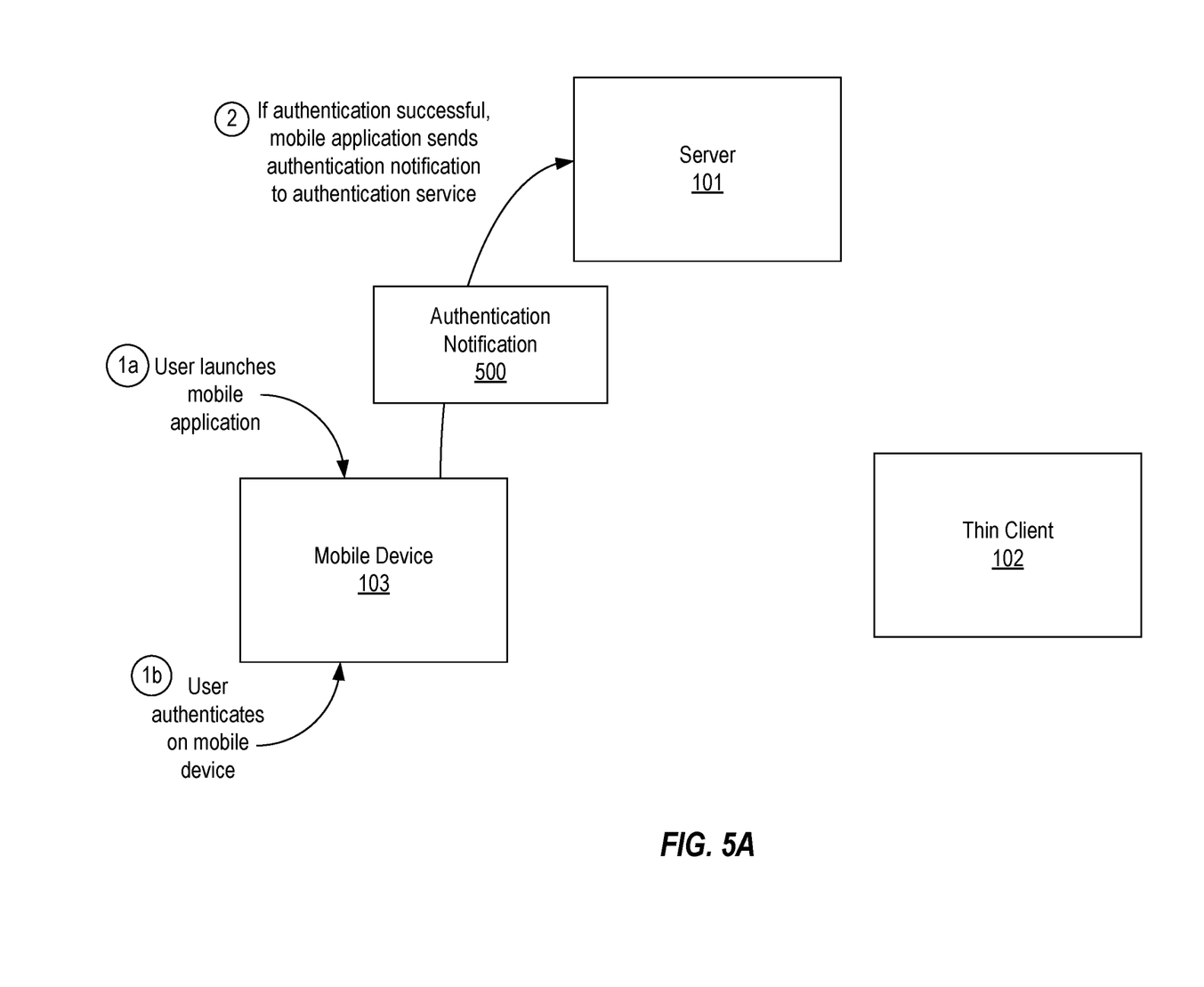
FIGS. 5A-5D illustrate an example sequence of steps that can be performed to allow a user to login to a thin client using an independent mobile device.

FIGS. 5A-5D illustrate an example sequence of steps that can be performed when a user employs his or her mobile device 103 to authenticate for purposes of logging in to a desktop on thin client 102. In FIG. 5A, it will be assumed that the user has approached thin client 102 and desires to log in. In accordance with the techniques of the present invention, the user can do so without needing to input a username and password to thin client 102. Instead, in steps 1a and 1b, the user can employ his mobile device 103 (e.g., his smart phone) to launch mobile application 300 and authenticate on mobile device 103.

The exact order of steps 1a and 1b is not essential. For example, in some embodiments, mobile application 300 may be configured to prompt the user to scan his fingerprint or perform some other type of authentication after launching mobile application 300. In other embodiments, mobile application 300 may be configured to rely on a previous authentication that the user provided (e.g., if the user authenticated within a defined amount of time prior to launching mobile application 300). In any case, mobile application 300 can be configured to interface with authentication architecture 103a for the purpose of confirming whether the user has been properly authenticated. For the remainder of the specification, it will be assumed that authentication architecture 103a is a fingerprint architecture. However, it should be understood that any other type of authentication system could equally be employed.

Assuming the user's fingerprint is authenticated in response to steps 1a and 1b, mobile application 300 can generate and send an authentication notification 500 to authentication service 220 on server 101. Authentication notification 500 can include mobile device information that uniquely identifies mobile device 103 (e.g., IMEI number, phone number, MAC address, etc.) and possibly authentication information (e.g., a fingerprint hash). As will be further described below, in some embodiments, the authentication information can be subsequently employed during the login process on thin client 102. In the current example, however, it will be assumed that authentication notification 500 simply confirms that authentication was performed on mobile device 103 but does not otherwise provide the authentication information that was employed to perform this authentication.

Figure 5B:
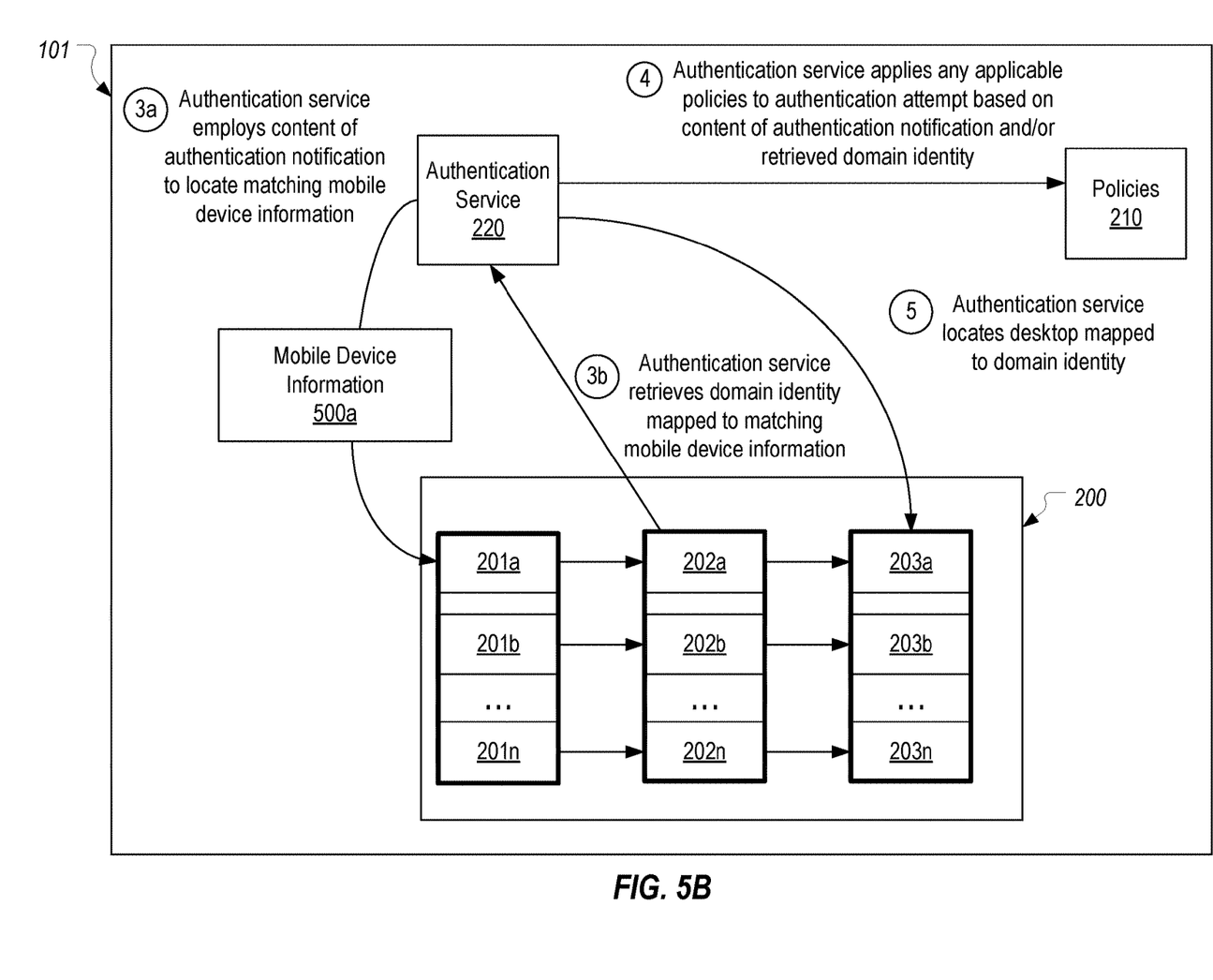

Turning to FIG. 5B, upon receiving authentication notification 500, authentication service 220, in step 3a, can employ mobile device information 500a contained in authentication notification 500 to locate matching mobile device information in mappings 200. In this example, it will be assumed that mobile device information 500a matches mobile device information 201a (i.e., that mobile device information 201a was created when the user registered mobile device 103 for authentication purposes). As a simple example, mobile device information 500a could include a phone number of 123-456-7890 and authentication service 220 can search through mobile device information 201a-201n for this phone number.

Based on the assumption that authentication service 220 identifies mobile device information 201a as matching mobile device information 500a, authentication service 220, in step 3b, can then employ the mapping to identify domain identity 202a as pertaining to the user of mobile device 103 (i.e., to the user that has just authenticated via mobile device 103). With domain identity 202a retrieved, authentication service 220 can access policies 210 to determine which, if any, policies apply to the current authentication process in step 4. For example, a policy may be linked to the user's domain identity, to a group to which the user belongs, to a type of mobile device 103, to a type of authentication employed on mobile device 103, to a time of day when authentication notification 500 is received, or to any other criteria. In one particular example, mobile device 103 may provide multiple forms of authentication and a policy may define which form is acceptable for a particular user. In such a case, if authentication notification 500 indicates that an unacceptable form of authentication was performed, authentication service 220 can fail the authentication process based on the policy. For example, assuming voice-based authentication is provided on mobile device 103 and that an applicable policy indicates that only fingerprint authentication is allowed, authentication service 220 could determine that authentication notification 500 includes a hash of speech input or some other indication that voice-based authentication was performed and can fail the authentication.

Next, in step 5, and assuming that the applicable policies 210 do not prevent authentication from succeeding, authentication service 220 can identify that domain identity 202a is mapped to thin client desktop 203a. For purposes of the present example, it will be assumed that thin client desktop 203a is associated with a single thin client 102 and therefore there would be no need to identify which thin client 102 the user should be logged into. However, this need not be the case as will be further described below.

Figure 5C:
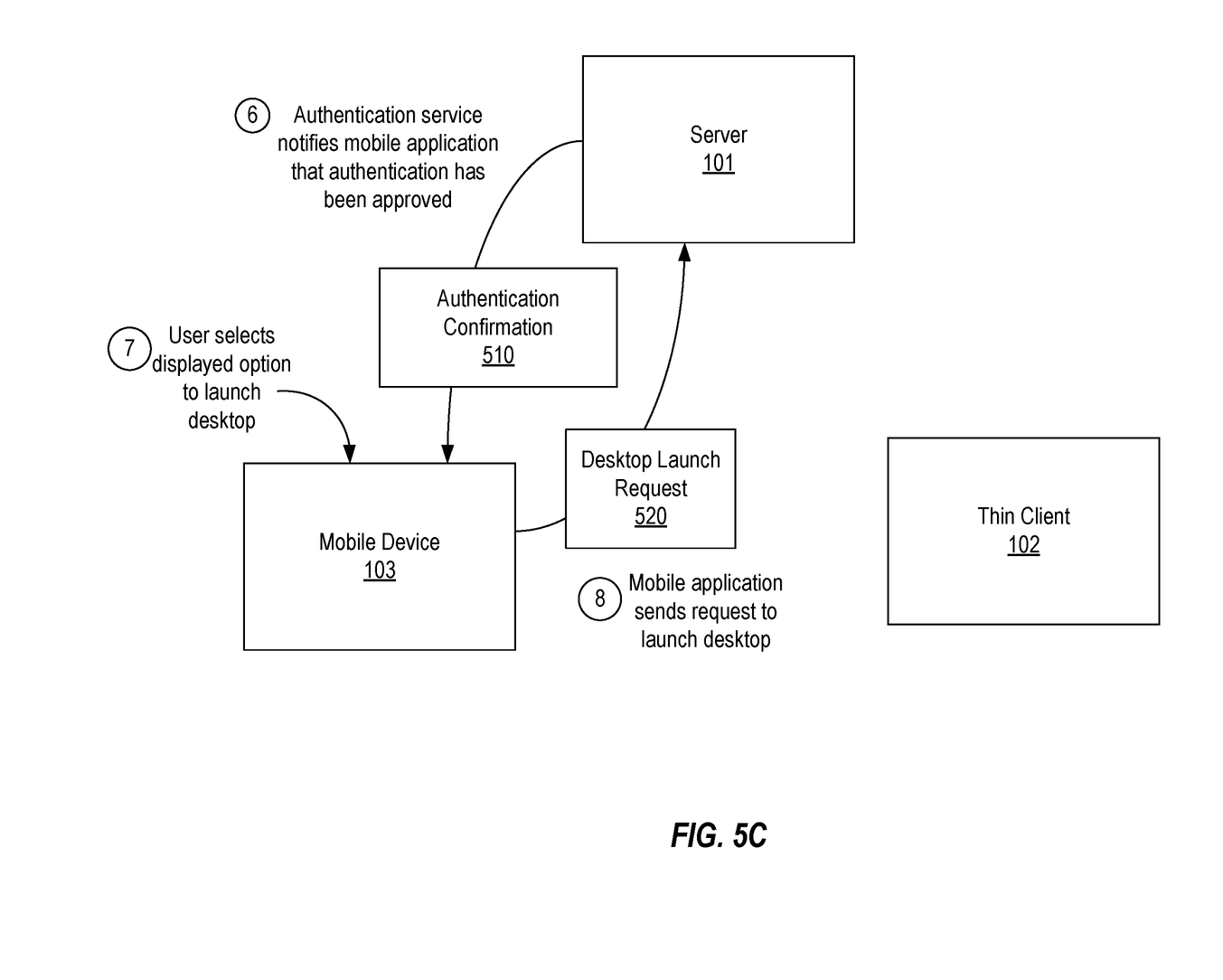

In step 6 shown in FIG. 5C, authentication service 220 is shown as sending authentication confirmation 510 to mobile application 300 to thereby notify the user that authentication has been verified. As a result, in step 7, mobile application 300 can display an option to launch thin client desktop 203a. In step 8, it is assumed that the user selects the option and therefore mobile application 300 sends a desktop launch request 520 back to authentication service 220. It is noted that steps 6-8 can be optional in some embodiments. In particular, in some embodiments, authentication service 220 may immediately launch thin client desktop 203a as soon as the verification process is completed. However, it may be preferred to perform steps 6-8 in some embodiments because it provides a degree of separation between the authentication and the launching of the desktop from the user's perspective. This separation can even be used to reduce the amount of time required to obtain a usable desktop. For example, a user can complete steps 1a and 1b prior to reaching thin client 102 (e.g., upon parking a vehicle at the office) which can cause a Wake-on-LAN to be sent to thin client 102 so that it is ready to launch the desktop (e.g., to receive desktop launch request 520) when the user reaches thin client 102. In this way, the user would not need to wait for thin client 102 to boot.

Also, in embodiments where the thin client desktop may be associated with multiple thin clients (e.g., in embodiments where the user may be allowed to log into more than one physical thin client device), authentication confirmation 510 can be structured to include an identification of each available thin client and then desktop launch request 520 can include the user's selection of a particular thin client. A similar process could be performed if the user has multiple domain identities (e.g., an administrator that uses both an admin username and a normal username) to allow the user to select from among the domain identities to which his mobile device information may be mapped. In such a case, the option to select a particular domain identity could be presented prior to evaluating any policies to ensure that the appropriate policies are applied to the selected identity. Alternatively, the user may be allowed to specify a particular thin client and/or a particular domain identity as part of authentication notification 500. For example, mobile application 300 can allow the user to input an identifier of a particular thin client prior to sending authentication notification 500.

In any case, after the steps depicted in FIGS. 5A-5C, authentication service 220 will have: (1) verified that the user has been authenticated using authentication architecture 103a on mobile device 103 (and possibly that applicable policy allows this type of authentication); (2) identified a thin client desktop; and (3) identified on which thin client the thin client desktop should be loaded. As a result, in step 9 shown in FIG. 5D, authentication service 220 can send a logon command 530 to agent 400 instructing agent 400 to initiate the login process on thin client 102. In some embodiments, it may be necessary to send a Wake-On-LAN command and/or a Restart command in conjunction with logon command 530. For example, if the thin client on which the user should be logged in is asleep, a Wake-On LAN command can be sent to wake the thin client up so that it may properly receive logon command 530.

Figure 5D:
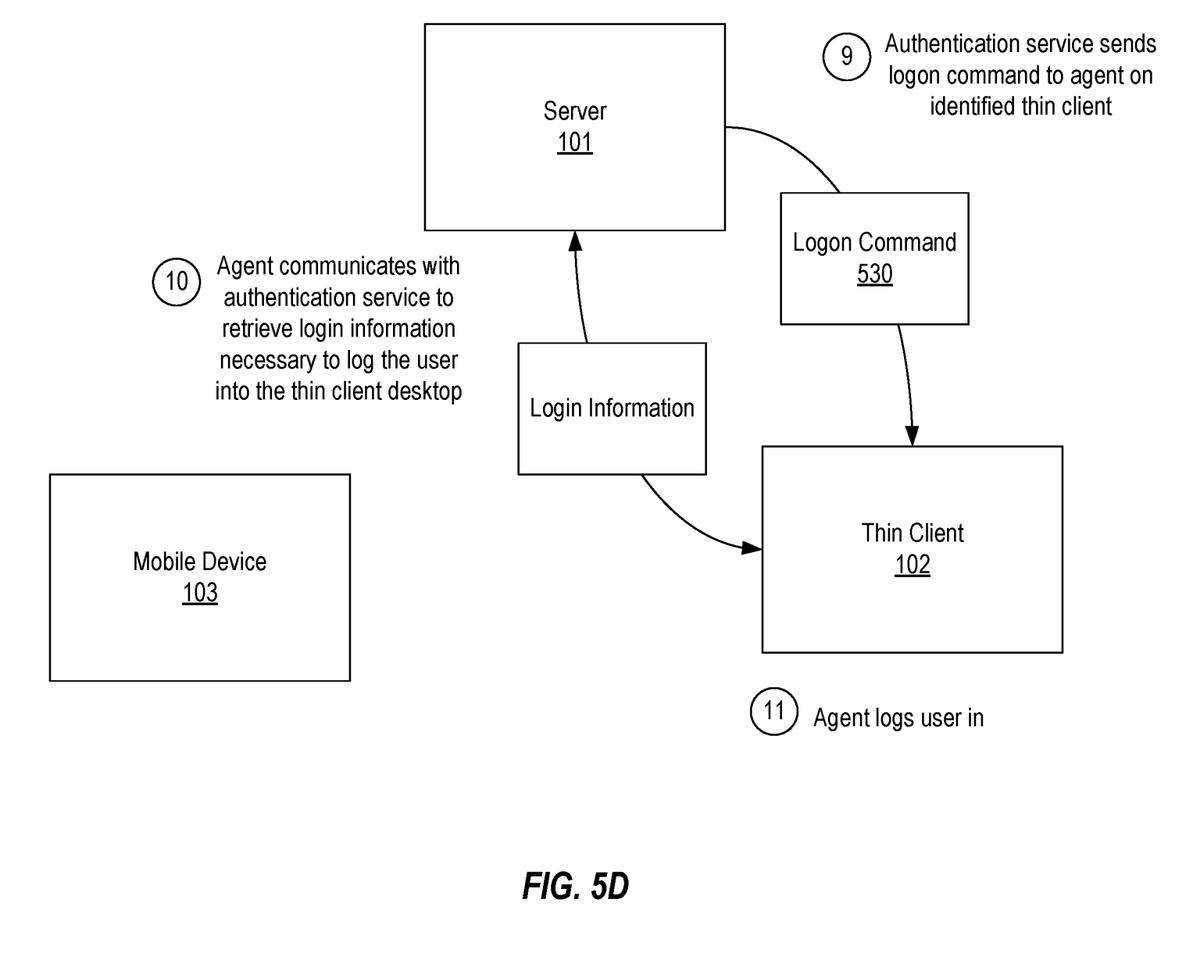

Upon receiving logon command 530 and in step 10, agent 400 can communicate with authentication service 220 to obtain the user's login information (e.g., a username and password defined in or otherwise associated with domain identity 202a). Finally, in step 11, agent 400 can employ the user's login information to log the user in to his desktop on client terminal 102. Step 11 can be performed in whatever way is allowed by the operating system. For example, agent 400 can automate the process of inputting the user's credentials into the operating system-provided login screen whether for a local or remote desktop session. In this way, the user will be logged in to his desktop on thin client 102 without ever needing to manually input his credentials on thin client 102, but instead based on performing authentication on his mobile device 103.

Figure 6A:
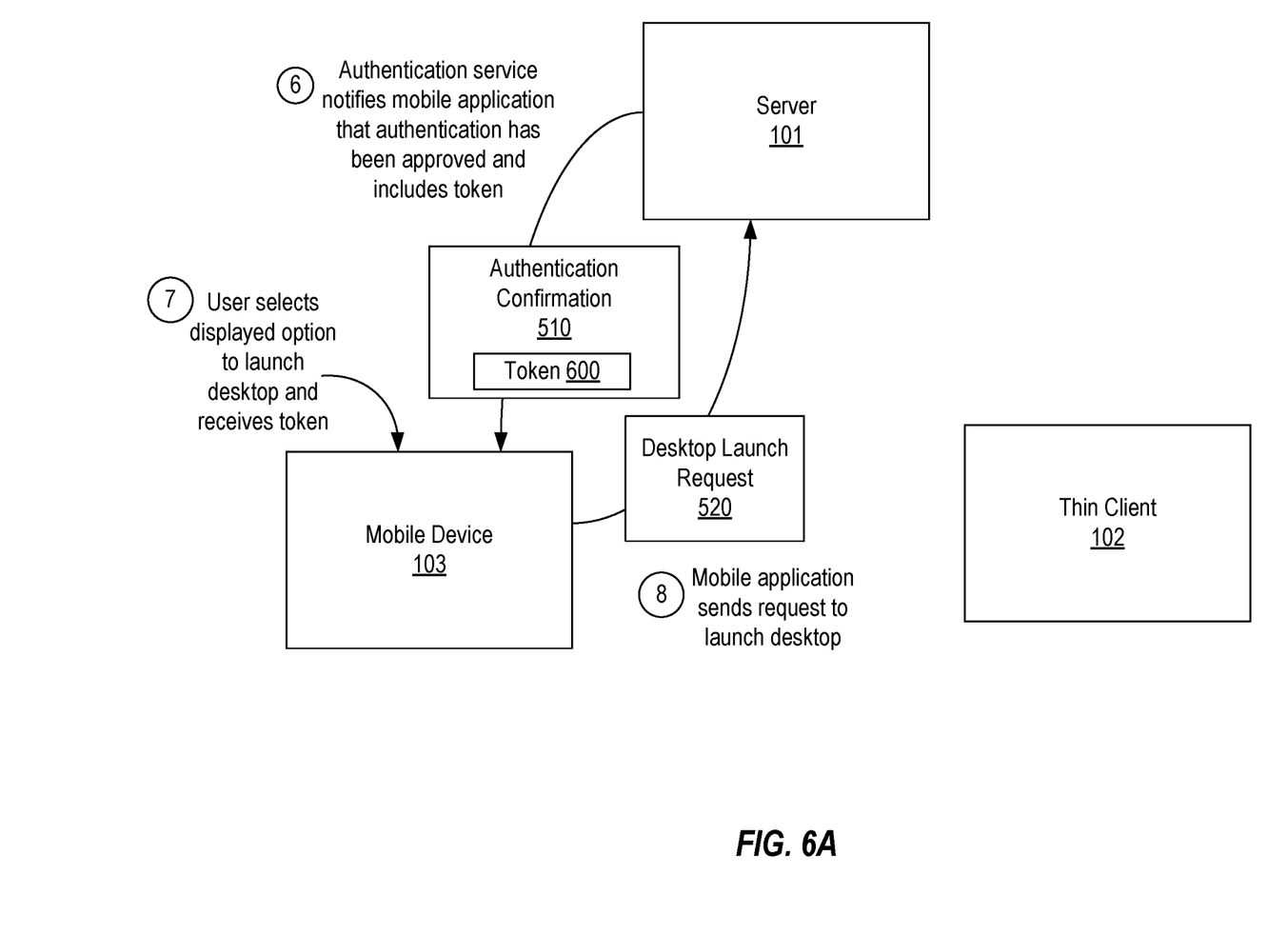
FIGS. 6A and 6B illustrate an alternate sequence of steps that can be employed to implement multi-factor authentication.
Figure 6B:
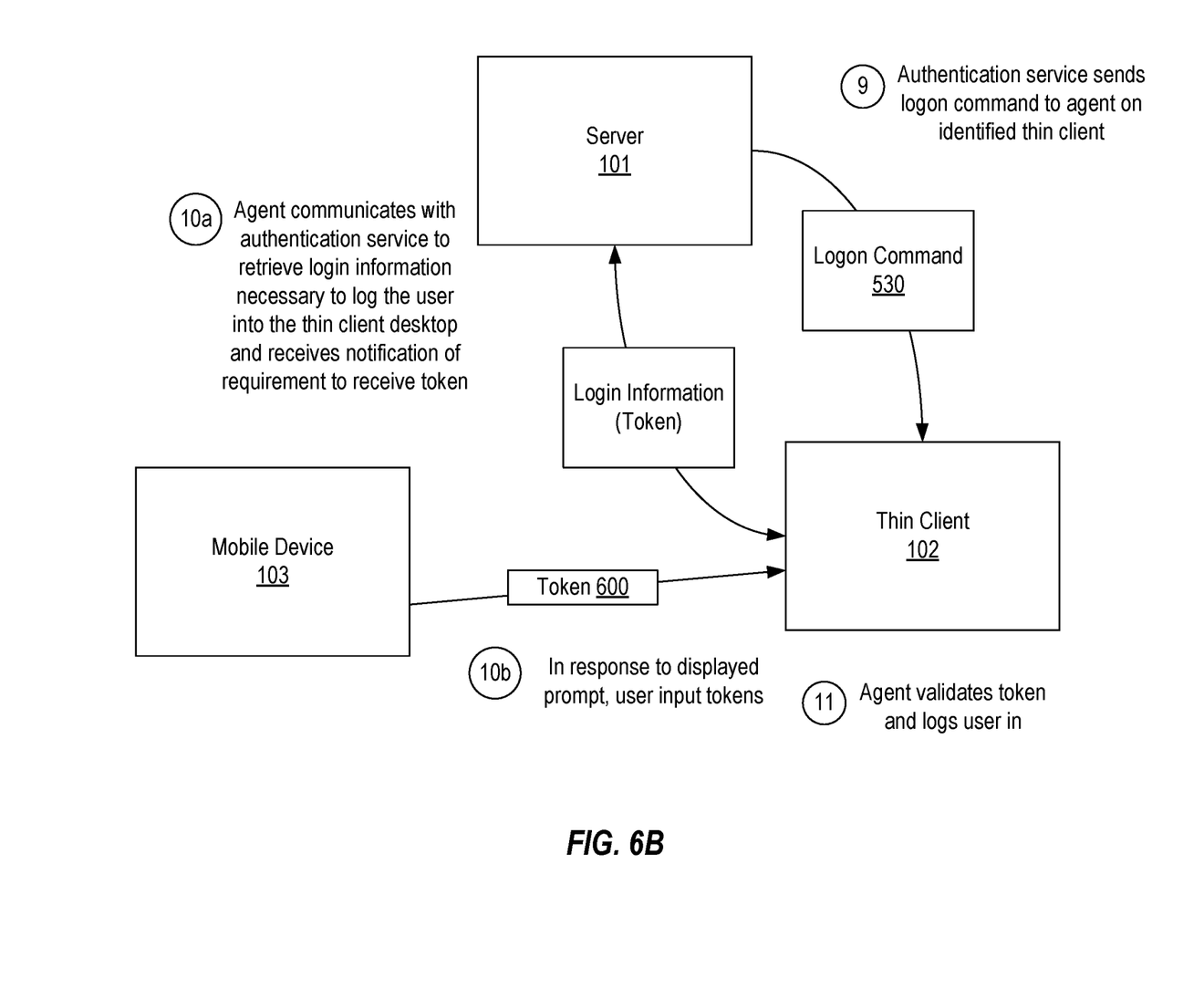

In FIGS. 5A-5D, it is assumed that single-step authentication is performed. In particular, although the user is authenticating on mobile device 103, the actual authentication on thin client 102 consists of the single step of inputting a username and password. In some embodiments, it may be desirable to implement multi-step authentication. FIGS. 6A and 6B illustrate how the process of FIGS. 5A-5D can be modified to allow for multi-step authentication.

FIGS. 6A and 6B correspond with FIGS. 5C and 5D but add additional steps/components to the process to require the user to input a token to thin client 102 as a second step of the authentication process. In FIG. 6A, step 6 has been modified such that authentication confirmation 510 includes a token 600 that can be generated by authentication service 220 after verifying authentication notification 500. Token 600 can be any random number or sequence of characters that the user will be able to input to thin client 102 to verify possession of the token. Accordingly, step 7 in FIG. 6A will include the display of token 600 to the user. For example, after the user selects the option to launch the desktop, the token can be displayed by mobile application 300 in conjunction with instructions to input the token on thin client 102. Step 8 can remain the same as described above.

In FIG. 6B, step 9 can still include sending logon command 530 to agent 400. However, in some embodiments, logon command 530 can include an indication that the input of a token will be required prior to logging in. Alternatively, such an indication could be provided as part of step 10a in which agent 400 retrieves the user's login information. In step 10b, agent 400 can prompt the user for input of token 600. In some embodiments, agent 400 may receive token 600 from authentication service 220 (e.g., in step 10a), and may therefore directly verify token 600 received from the user. Alternatively, agent 400 could be configured to send token 600 received from the user back to authentication service 220 for verification. In either case, if token 600 submitted by the user matches token 600 generated by authentication service 220, agent 400 can then proceed to log the user in.

As indicated above, thin client 102 should be construed as any computing device that provides a desktop whether local or remote. Accordingly, in some embodiments, thin client desktop 203a can represent a desktop of a remote session in a virtual desktop infrastructure environment. Equally, in some embodiments, thin client desktop 203a can represent a desktop of a local session on thin client 102 including in cases where VDI components may be executed on thin client 102 to connect to a remote desktop.

As was indicated above, in some embodiments, mobile application 300 can be configured to include authentication information in authentication notification 500. In such cases, authentication service 220 can be configured to include this authentication information in the login information that it provides to agent 400 in step 10/10a. For example, assuming authentication architecture 103a comprises a fingerprint sensor, mobile application 300 can obtain a fingerprint hash from authentication architecture 103a (which will represent the user's fingerprint that was employed in the authentication process on mobile device 103) and then include this fingerprint hash in authentication notification 500. Authentication service 220 can then send this fingerprint hash to agent 400 which can then submit the fingerprint hash, possibly in conjunction with a password, to the login infrastructure on the operating system on thin client 102. In this way, thin client 102 will be able to directly perform fingerprint-based authentication even though it does not include a fingerprint sensor.

Figure 7:
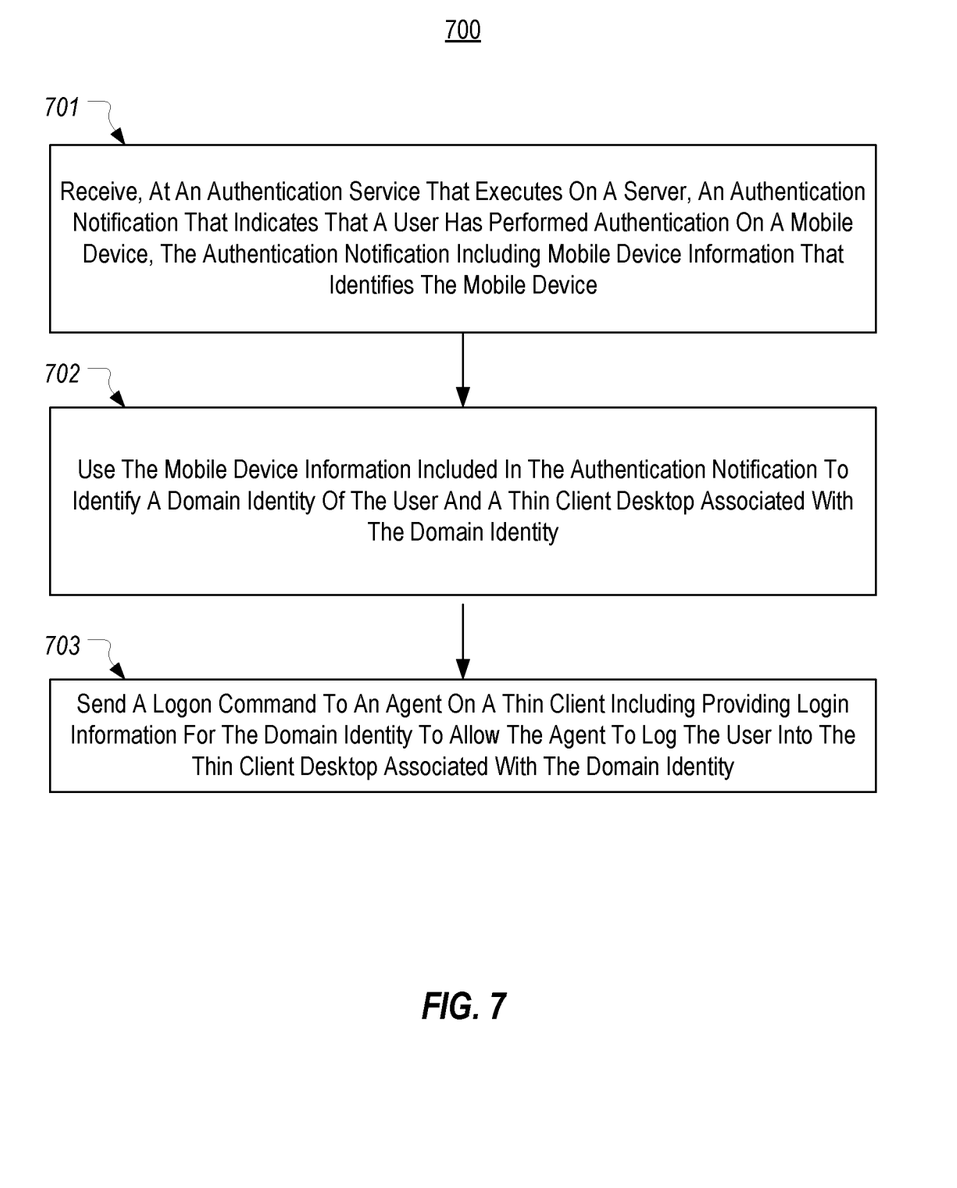
FIG. 7 provides a flowchart of an example method for performing authentication on a thin client using a mobile device.

FIG. 7 provides a flowchart of an example method 700 for performing authentication on a thin client using a mobile device. Method 700 can be performed by authentication service 220.

Method 700 includes an act 701 of receiving, at an authentication service that executes on a server, an authentication notification that indicates that a user has performed authentication on a mobile device, the authentication notification including mobile device information that identifies the mobile device. For example, authentication service 220 can receive authentication notification 500 from mobile application 300. Authentication notification 500 can include information about mobile device 103 and may possibly include authentication information that was generated when the user authenticated on mobile device 103.

Method 700 includes an act 702 of using the mobile device information included in the authentication notification to identify a domain identity of the user and a thin client desktop associated with the domain identity. For example, authentication service 220 can employ the contents of authentication notification 500 to identify matching mobile device information 201*a* and then identify domain identity 202*a* and thin client desktop 203*a* from the matching mobile device information.

Method 700 includes an act 703 of sending a logon command to an agent on a thin client including providing login information for the domain identity to allow the agent to log the user into the thin client desktop associated with the domain identity. For example, authentication service 220 can send logon command 530 to agent 400 on thin client 102 possibly in conjunction with a Wake-On-LAN and/or restart command. Additionally authentication service 220 can provide login information necessary for agent 400 to log the user of mobile device 103 into thin client desktop 203*a* on thin client 102.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for performing authentication on a thin client using a mobile device, the method comprising:
    maintaining, by an authentication service that executes on a server, mappings, each of the mappings linking mobile device information for a particular mobile device to a domain identity of a particular user and linking the domain identity of the particular user to a particular thin client desktop;
    executing, on a first mobile device, a mobile application;
    authenticating, by the mobile application, a first user of the first mobile device, wherein the mobile application authenticates the first user by employing an authentication architecture of the first mobile device;
    after authenticating the first user by employing the authentication architecture of the first mobile device, sending, by the mobile application, an authentication notification to the authentication service, the authentication notification indicating that the first user has been authenticated on the first mobile device, the authentication notification including mobile device information that identifies the first mobile device;
    in response to receiving the authentication notification, comparing, by the authentication service, the mobile device information that was included in the authentication notification to the mappings;
    based on the comparison, determining, by the authentication service, that a first mapping of the mappings links the mobile device information that was included in the authentication notification to a domain identity of the first user;
    determining, by the authentication service, that the first mapping links the domain identity of the first user to a first thin client desktop;
    in response to receiving the authentication notification that indicates that the first user has been authenticated on the first mobile device and based on the first mapping linking the mobile device information that was included in the authentication notification to the domain identity of the first user, sending, by the authentication service, a logon command to an agent on a thin client including providing login information for the domain identity of the first user; and
    in response to receiving the logon command, logging, by the agent on the thin client, the first user into the first thin client desktop that is linked to the domain identity of the first user such that the first user is logged into the first thin client desktop on the thin client based on the authentication of the first user that employed the authentication architecture of the first mobile device rather than requiring the first user to input credentials to the thin client.

2. The method of claim 1, wherein the mobile device information that identifies the first mobile device includes one or more of an IMEI number, a phone number, or a MAC address of the first mobile device.

3. The method of claim 1, wherein the domain identity of the first user comprises a username.

4. The method of claim 1, wherein the first thin client desktop is a local desktop.

5. The method of claim 1, wherein the first thin client desktop is a remote desktop.

6. The method of claim 1, wherein the login information includes authentication information that was received from the first mobile device in the authentication notification.

7. The method of claim 1, further comprising:
prior to sending the logon command, evaluating, by the authentication service, the authentication notification against one or more policies.

8. The method of claim 7, wherein the one or more policies are identified based on the domain identity of the first user.

9. The method of claim 1, further comprising:
sending, by the authentication service, an authentication confirmation to the mobile application; and
in response to the authentication confirmation, receiving, by the authentication service, a desktop launch request from the mobile application;
wherein the authentication service sends the logon command in response to receiving the desktop launch request.

10. The method of claim 9, wherein the authentication confirmation includes a token, the method further comprising:
validating a token received by the thin client against the token that was included in the authentication confirmation.

11. The method of claim 1, wherein the login information includes a username and password for the domain identity of the first user.

12. The method of claim 1, further comprising:
sending a Wake-On-LAN command to the agent.

13. The method of claim 1, wherein the authentication architecture of the first mobile device is a biometric-based authentication architecture.

14. The method of claim 1, wherein the first mobile device is a smart phone.

15. The method of claim 1, wherein the thin client to which the logon command is sent is selected based on input from the first user, or based on an identification of the thin client that is associated with the first thin client desktop.

16. One or more non-transitory computer storage media storing computer-executable instructions which when executed implement a method comprising:
maintaining, by an authentication service that executes on a server, mappings, each of the mappings linking mobile device information for a particular mobile device to a domain identity of a particular user and linking the domain identity of the particular user to a particular thin client desktop;
executing, on a first mobile device, a mobile application;
authenticating, by the mobile application, a first user of the first mobile device, wherein the mobile application authenticates the first user by employing an authentication architecture of the first mobile device;
after authenticating the first user by employing the authentication architecture of the first mobile device, sending, by the mobile application, an authentication notification to the authentication service, the authentication notification indicating that the first user has been authenticated on the first mobile device, the authentication notification including mobile device information that identifies the first mobile device;
in response to receiving the authentication notification, comparing, by the authentication service, the mobile device information that was included in the authentication notification to the mappings;
based on the comparison, determining, by the authentication service, that a first mapping of the mappings links the mobile device information that was included in the authentication notification to a domain identity of the first user;
determining, by the authentication service, that the first mapping links the domain identity of the first user to a first thin client desktop;
in response to receiving the authentication notification, sending, by the authentication service, a logon command to an agent on a thin client;
based on the first mapping linking the mobile device information that was included in the authentication notification to the domain identity of the first user, providing, by the authentication service, login information associated with the domain identity of the first user to the agent; and
employing, by the agent, the login information to log the first user into the first thin client desktop on the thin client such that the first user is logged into the first thin client desktop on the thin client based on the authentication of the first user that employed the authentication architecture of the first mobile device rather than requiring the first user to input credentials to the thin client.

17. The computer storage media of claim 16, wherein the method further comprises, prior to the agent employing the login information to log the first user into the first thin client desktop on the thin client:
sending, by the authentication service, a token to the mobile application;
receiving, at the agent, the token; and
validating the token received by the agent against the token sent by the authentication service.

18. The computer storage media of claim 16, wherein the method further comprises:
evaluating, by the authentication service, the authentication notification against one or more policies.

19. A method for logging a user into a thin client desktop, the method comprising:
maintaining, by an authentication service that executes on a server, mappings, each of the mappings linking mobile device information for a particular mobile device to a domain identity of a particular user and linking the domain identity of the particular user to a particular thin client desktop;
executing, on a first mobile device, a mobile application;
authenticating, by the mobile application, a first user of the first mobile device, wherein the mobile application authenticates the first user by employing an authentication architecture of the first mobile device;
after authenticating the first user by employing the authentication architecture of the first mobile device, sending, by the mobile application, an authentication notification to the authentication service, the authentication notification indicating that the first user has been authenticated on the first mobile device, the authentication notification including mobile device information that identifies the first mobile device;

in response to receiving the authentication notification, accessing, by the authentication service, the mappings using the mobile device information that identifies the first mobile device;

determining, by the authentication service, that a first mapping of the mappings links the mobile device information that identifies the first mobile device to a domain identity of the first user and links the domain identity of the first user to a first thin client desktop;

in response to the authentication notification and based on the determination, instructing, by the authentication service, an agent on a thin client to employ the domain identity of the first user to log the first user into the first thin client desktop on the thin client; and based on the instruction, logging, by the agent on the thin client, the first user into the first thin client desktop such that the first user is logged into the first thin client desktop on the thin client based on the authentication of the first user that employed the authentication architecture of the first mobile device rather than requiring the first user to input credentials to the thin client.

20. The method of claim 19, wherein instructing the agent on the thin client to employ the domain identity of the first user to log the first user into the first thin client desktop on the thin client comprises providing one or more of:

a password; or authentication information that was included in the authentication notification.

* * * * *